United States Patent [19]

Onuma et al.

[11] Patent Number: 5,353,141
[45] Date of Patent: Oct. 4, 1994

[54] METHOD FOR ALIGNING TREATMENT OF LIQUID CRYSTAL DEVICE INCLUDING VARYING WITH TIME THE FEEDING SPEED OF THE RUBBING ROLLER

[75] Inventors: Kenji Onuma, Isehara; Mayumi Yoshioka, Hadano; Yukio Hanyu, Atsugi; Yasuto Kodera, Fujisawa; Takatsugu Wada, Atsugi, all of Japan

[73] Assignee: Canon Kabushiki Kaisha, Tokyo, Japan

[21] Appl. No.: 956,400

[22] Filed: Oct. 5, 1992

[30] Foreign Application Priority Data

Oct. 8, 1991 [JP] Japan ................................ 3-287236
Jan. 31, 1992 [JP] Japan ................................ 4-040605

[51] Int. Cl.⁵ ..................... G02F 1/1337; G02F 1/13
[52] U.S. Cl. ........................................ 359/76; 359/78; 359/100
[58] Field of Search ................... 359/76, 78, 62, 100

[56] References Cited

U.S. PATENT DOCUMENTS

| 4,367,924 | 1/1983 | Clark et al. ........................ 350/344 |
| 4,561,726 | 12/1985 | Goodby et al. .................... 350/341 |
| 4,589,996 | 5/1986 | Inoue et al. ....................... 252/299.65 |
| 4,592,858 | 6/1986 | Higuchi et al. .................... 252/299.66 |
| 4,596,667 | 6/1986 | Inukai et al. ...................... 252/299.65 |
| 4,613,209 | 9/1986 | Goodby et al. .................... 350/350 S |
| 4,614,609 | 9/1986 | Inoue et al. ....................... 252/299.66 |
| 4,622,165 | 11/1986 | Kano et al. ........................ 252/299.65 |
| 4,639,089 | 1/1987 | Okada et al. ...................... 350/341 |
| 5,151,804 | 9/1992 | Verhulst et al. ................... 359/76 |
| 5,172,255 | 12/1992 | Brosig et al. ..................... 359/78 |
| 5,221,981 | 6/1993 | Kodera et al. .................... 359/76 |

FOREIGN PATENT DOCUMENTS

| 61-249021 | 11/1986 | Japan ................................. 359/76 |
| 64-55527 | 3/1989 | Japan ................................. 359/76 |
| 64-55528 | 3/1989 | Japan ................................. 359/76 |
| 1-161313 | 6/1989 | Japan ................................. 359/76 |
| 2-219027 | 8/1990 | Japan ................................. 359/76 |
| 4-081720 | 3/1992 | Japan ................................. 359/76 |
| 4-119325 | 4/1992 | Japan ................................. 359/76 |

OTHER PUBLICATIONS

Solid State Phys., vol. 16, No. 3 (1981), pp. 141–151.
Clark et al, "Submicrosecond bistable electro-optic switching in liquid crystals", App. Phys. Lett., vol. 36, No. 11 (Jun. 1980), pp. 899–901.
Igarashi et al, "On the Possibility of Increasing the Detection Efficiency of Exoelectrons" J. Journal App. Phys., vol. 19, No. 10 (Oct. 1980), pp. 2019–2020.
Meyer et al, "Ferroelectric liquid crystals", J. Phys. Lett., vol. 36 (Mar. 1975), pp. L–69–L–71.

Primary Examiner—Anita P. Gross
Attorney, Agent, or Firm—Fitzpatrick, Cella, Harper & Scinto

[57] ABSTRACT

A liquid crystal device, particularly a ferroelectric liquid crystal device, is constituted by disposing a liquid crystal disposed between a pair of rubbing-treated substrates. The uniaxial alignment control force exerted by rubbing is gradually weakened as the rubbing treatment is successively applied to a large number of substrates. This is compensated by varying a rubbing condition, such as a relative moving speed, a rotational speed, or a pressing depth against the substrate of a rubbing roller. Alternatively, such a change in uniaxial alignment control force with time may be utilized for compensating for a difference in uniaxial alignment control force attributable to a difference in stripe electrode extension relative to the rubbing direction.

34 Claims, 11 Drawing Sheets

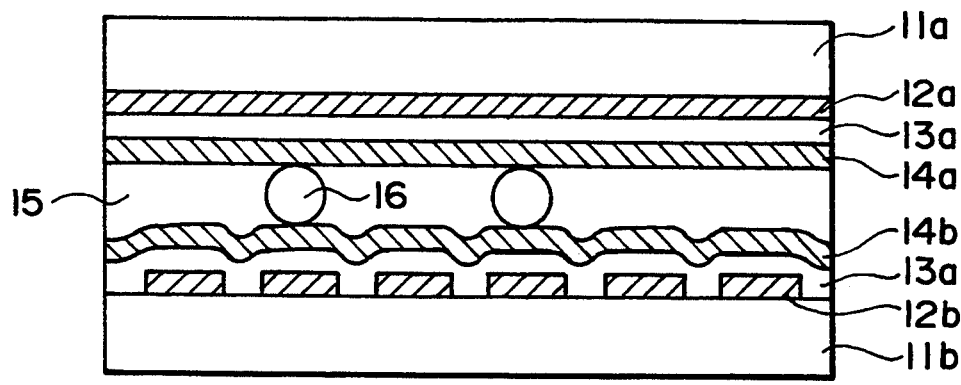
F I G. 5
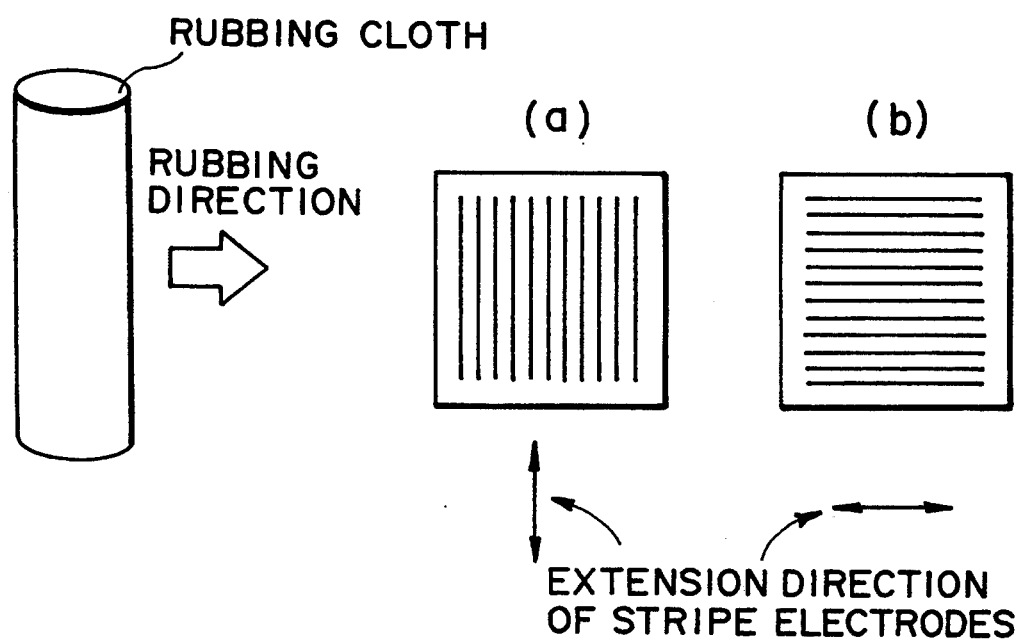
F I G. 6

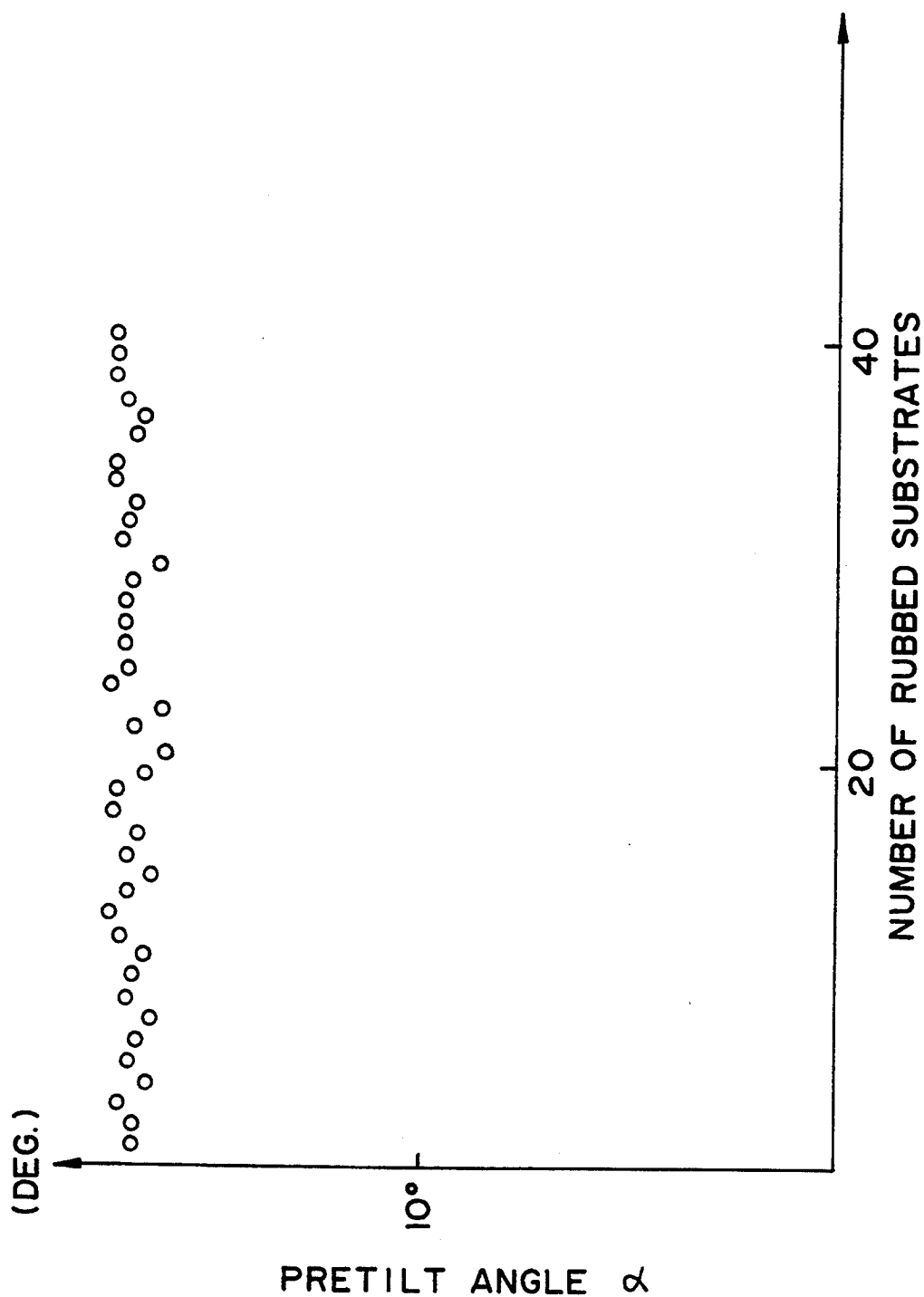

METHOD FOR ALIGNING TREATMENT OF LIQUID CRYSTAL DEVICE INCLUDING VARYING WITH TIME THE FEEDING SPEED OF THE RUBBING ROLLER

FIELD OF THE INVENTION AND RELATED ART

The present invention relates to a method for aligning treatment suitable for a liquid crystal device, particularly a ferroelectric liquid crystal device, used as a liquid crystal display device or a liquid crystal shutter, and more particularly to an aligning treatment method for improving the alignment state of liquid crystal molecules so as to improve, e.g., the display characteristics of such a liquid crystal device.

A display device of the type which controls transmission of light in combination with a polarizing device by utilizing the refractive index anisotropy of ferroelectric liquid crystal molecules has been proposed by Clark and Lagerwall (U.S. Pat. Nos. 4,367,924 and 4,639,089, etc.).

The display device is provided with an electrode matrix composed of scanning electrodes and data electrodes for multiplexing drive of a chiral smectic liquid crystal, wherein the scanning electrodes are sequentially supplied with a scanning signal and the data electrodes are supplied with data signals in synchronism with the scanning signal.

The chiral smectic liquid crystal used in this type of display device has generally chiral smectic C phase (SmC*) of H phase (SmH*) of a non-helical structure in a specific temperature range and, in the SmC* or SmH* phase, shows a property of assuming either one of a first optically stable state and a second optically stable state responding to an electrical field applied thereto and maintaining such a state in the absence of an electrical field, namely bistability, and also has a quick responsiveness to the change in electrical field. Thus, it is expected to be utilized in a high speed and memory type display device and particularly to provide a large-area, high-resolution display in view of its excellent function.

The ferroelectric liquid crystal device is an optical modulation device using such a liquid crystal showing bistability and comprises a ferroelectric liquid crystal disposed between a pair of substrates each having thereon transparent electrodes. The transparent electrodes on each substrate are covered with an alignment film as a layer contacting the ferroelectric liquid crystal and for aligning the liquid crystal molecules within the liquid crystal device.

For an optical modulating device by use of a ferroelectric liquid crystal having such bistability to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I_0 = \sin^2 4\theta \sin^2(\Delta nd/\lambda)\pi,$$

wherein $I_0$: incident light intensity,

I: transmitted light intensity, $\theta$: tilt angle, $\Delta n$: refractive index anisotropy, d: thickness of the liquid crystal layer, $\lambda$: wavelength of the incident light.

The tilt angle $\theta$ in the above-mentioned non-helical structure is recognized as a half of an angle between the average molecular axis directions of liquid crystal molecules in a twisted alignment in a first orientation state and a second orientation state. According to the above equation, it is shown that a tilt angle $\theta$ of 22.5 degrees provides a maximum transmittance and the tilt angle in a non-helical structure for realizing bistability should desirably be as close as possible to 22.5 degrees in order to provide a high transmittance and a high contrast.

A method for aligning a ferroelectric liquid crystal should desirably be such that molecular layers each composed of a plurality of molecules of a smectic liquid crystal are aligned uniaxially along their normals, and it is desirable to accomplish such an alignment state by a rubbing treatment which requires only a simple production step.

As an alignment method for a ferroelectric liquid crystal, particularly a chiral smectic liquid crystal in a non-helical structure, one disclosed in U.S. Pat. No. 4,561,726 has been known for example.

On the other hand, as a uniaxial aligning treatment method, there has been also reported a method of providing uniform alignment with a high pretilt surface by oblique evaporation of SiO (Matsushita Denki K.K., Japan Display '86, 464–467). This aligning method is not suitable for uniform alignment of a large panel. Accordingly, it has been desired to provide a high pretilt surface by rubbing aligning treatment excellent in productivity.

For this reason, it has been proposed to provide a uniform alignment state through a high pretilt aligning treatment by rubbing an alignment film of a fluorine-containing polyimide, etc.

The rubbing method is explained with reference to a schematic perspective view as shown in FIG. 1.

The rubbing method is a method wherein a substrate is rubbed with, e.g., a cloth comprising pile yarn in one direction to align liquid crystal molecules in the rubbed direction. The rubbing should be applied uniformly to the entire substrate surface. In view of productivity, the rubbing may be generally performed in a manner as illustrated in FIG. 1. Referring to FIG. 1, a rubbing cloth 302 comprising pile yarn is applied around a cylindrical rubbing roller 301. The roller 301 is rotated in a direction of A or B while a substrate 101 (or 101a) or the rubbing roller 301 is moved relative to each other transversely in a direction of C or D and the pile yarn of the rubbing cloth 302 is caused to contact and rub the entire surface of the substrate 101 (or 101a). Hereinafter, this treatment may be called representatively a rubbing treatment hereinbelow.

By the rubbing treatment conventionally practiced, the conditions thereof including the moving velocity (feed speed) and rotational speed (number of rotation per unit time) of the rubbing roller, and the degree of pressing (pressing depth) of the rubbing roller 301 against the substrate 101 (or 101a), have been fixed at desired values and used for treating a large number of substrates under the same conditions.

However, in the conventional method of using the fixed rotation speed, moving velocity and degree of pressing, the uniaxial (uniform) alignment control force imparted to the substrates is gradually weakened due to wearing of the pile yarn as the rubbing treatment is repeated. As a result, the pretilt angle, i.e., an angle of liquid crystal molecules at the substrate surface with respect to the substrate surface, is gradually changed as the rubbing treatment is repeated. Thus, it becomes difficult to obtain a uniform alignment state by the respective substrates so that the rubbing cloth has been required to be renewed in an early stage.

Particularly, a high pretilt alignment for providing a pretilt angle of 10 degrees or larger is sensitive to rubbing intensity, the pretilt angle is liable to be deviated largely as the number of rubbed substrate sheets increases even if the rubbing conditions are accurately set initially. In some case, for example, when substrates (40 sheets) for 20 panels were treated by rubbing, only 5 panels initially treated could provide a uniform alignment of a good quality and the remaining 15 panels failed to show desired alignment characteristics, thus being regarded as inadequate products. This problem occurs generally while the degree can depend on the kind of a rubbing roller used.

If the rubbing roller (or rubbing cloth) is renewed in an early stage, the productivity is lowered and the production cost is increased.

Another problem of aligning treatment for aligning liquid crystal has been found as a cause of failing to provide devices of good bistability.

When a rubbing treatment is applied to a pair of upper and lower substrates each having stepwise elevations due to stripe electrodes for multiplexing drive, the upper and lower substrates having the stepwise elevations extending in different directions are caused to have different alignment control forces after the rubbing treatment.

As a result, the upper and lower substrates provides liquid crystal molecules threat different pretilt angles so that equivalency between the first optically stable state and the second optically stable state is liable to be lost. For this reason, the threshold value (voltage amplitude or pulse width) for switching from one optically stable state to the other optically stable state becomes different from the one for switching from the other to the one. This is assumed to provide a cause for failure in production of devices with good bistability.

It is therefore important to provide an equivalent aligning treatment regardless of a difference in extending direction of stripe electrodes.

SUMMARY OF THE INVENTION

An object of the present invention is to provide an aligning treatment method having solved the above-mentioned problems and thus providing a uniform alignment of good quality.

An object of the invention is to provide an aligning treatment for providing a ferroelectric liquid crystal device with good bistability and free from difference in threshold value as described above.

An object of the invention is to provide an aligning treatment method capable of providing a desired alignment characteristic even when the rubbing roller is somewhat worn.

A further object of the invention is to provide an aligning treatment method capable of providing a desired alignment characteristic regardless of difference in extending direction of stripe electrodes with respect to the rubbing direction by the rubbing roller.

Another object of the invention is to provide an aligning treatment method capable of minimizing the frequency of renewal of the rubbing roller or rubbing cloth, i.e., capable of increasing the number of substrates treated by one rubbing roller or rubbing cloth and excellent in productivity.

A further object of the invention is to provide an aligning treatment method capable of providing substrates with excellent aligning treatment by using a conventional apparatus for aligning treatment as it is or with a partial modification.

According to the present invention, there is provided an aligning treatment method for a liquid crystal device including a liquid crystal between a pair of substrates, comprising successively rubbing a plurality of substrates while varying a rubbing condition with time.

According to another aspect of the present invention, there is provided an aligning treatment method for a liquid crystal device including a pair of substrates each provided with stripe electrodes and a liquid crystal disposed between the substrates; the method comprising rubbing the pair of substrates in such an order that one substrate having stripe electrodes extending in a direction perpendicular to or closer to the perpendicular to the rubbing direction is rubbed first, and then the other substrate having stripe electrodes extending in a direction to parallel to or closer to the parallel to the rubbing direction is rubbed.

According to a further aspect of the present invention, there is provided an aligning treatment method for a liquid crystal device including a pair of substrates each provided with stripe electrodes and a liquid crystal disposed between the substrates; the method comprising rubbing the pair of substrates at different rubbing intensities.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 5 is a sectional view taken along the line V—V in FIG. 4.

FIG. 6 is a schematic illustration of a relationship between a rubbing direction and stripe electrode substrates.

FIGS. 12 and 13 are graphs showing results of pretilt angle measurement in Example 5 and Comparative Example 4, respectively.

DESCRIPTION OF THE PREFERRED EMBODIMENTS

Figure 1:
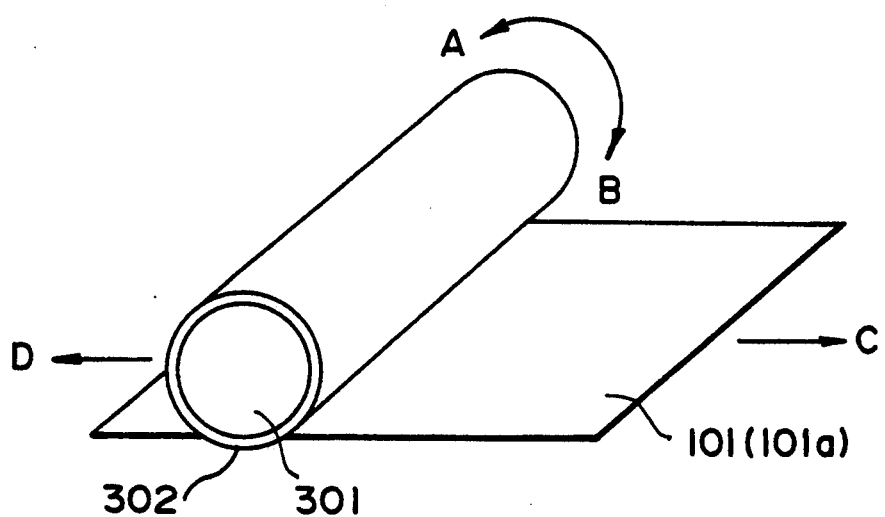
FIG. 1 is a schematic perspective view for illustrating an embodiment of the rubbing treatment.

According to our study, it has been understood that, as the extension direction of stripe electrodes leaves from parallel toward perpendicular with respect to the rubbing direction, a larger friction with a rubbing cloth results due to stepwise elevations originating from the stripe electrodes and reversely the alignment control force imparted to the substrates is gradually attenuated. Further, if rubbing treatment is repeated by a single rubbing cloth, the alignment control force imparted to the substrates is gradually weakened. This may be attributable to wearing of the rubbing cloth.

According to the present invention, based on the above knowledge, rubbing treatment is applied to a pair of upper and lower substrates, the order of rubbing may be appropriately fixed or the intensity of the rubbing treatment may be varied for the respective substrates, whereby the alignment control forces imparted to the respective substrates may be equalized, thus avoiding the above-mentioned difference in threshold value.

In other words, the present invention is based on a discovery that an improved rubbing performance is obtained by varying the rubbing conditions or selecting an appropriate order of rubbing treatment.

Rubbing conditions may include various ones, including, among others, the rotation speed of the rubbing roller, the material of the rubbing roller, the kind of the rubbing roller surface (or rubbing cloth), the degree of pressing of the rubbing roller against the substrate, and the relative moving speed between the rubbing roller and the substrates.

Among these rubbing conditions, it is possible to vary the rubbing roller rotation speed, the degree of pressing the rubbing roller against the substrate and the relative moving speed between the rubbing roller and the substrate so as to cope with the change with time of the rubbing roller without lowering the production efficiency.

Therefore, according to the present invention, the rotation speed, the degree of pressing, or the relative moving speed may be appropriately varied so as to provide an improved alignment performance.

The degree of the variation in rotation speed, degree of pressing and relative moving speed can depend on the material and form of the rubbing roller or the rubbing cloth, the material of an alignment film on the substrate, the unevenness of the substrate, etc., and cannot simply be determined. For example, however, the rotation speed may be varied by at least 1%, preferably at least 3%, the degree of pressing may be varied by at least 1%, preferably at least 3%, and the relative moving speed may be varied by at least 0.5%, preferably at least 1%, further preferably at least 3%, respectively per substrate. However, the actual condition change may be performed linearly, or stepwise, e.g., after rubbing each substrate, a pair of substrates, or a group (e.g., several pairs) of substrates, at the above-mentioned rate.

In view of the difference in easiness of imparting a rubbing effect depending on the difference in extension direction of stripe electrodes on the substrate, the rubbing treatment may be applied to a substrate which is not readily imparted with a rubbing effect in a stage where the rubbing roller (or rubbing cloth) is less worn or deteriorated and thereafter to a substrate which is more readily imparted with a rubbing effect, whereby a substantially uniform aligning treatment may be easily applied to both types of substrates.

As a specific example, for a combination of a substrate I having stripe electrodes extending in parallel or substantially in parallel and a substrate II having stripe electrodes extending perpendicularly or substantially perpendicularly, respectively, to the central axis of the rubbing roller, the rubbing treatment, i.e., aligning treatment, may be applied in the order of the substrate I and the substrate II.

The extension directions of the stripe electrodes need not be restricted to those described above, and the above-mentioned sequence of aligning treatment my be applicable to a pair of substrates having a different combination of stripe electrode extension directions deviated more noticeably from the parallel or perpendicular if the combination provides a difference in readiness of imparting aligning treatment effect.

Hereinbelow, some preferred embodiments of the present invention will be described with reference to the drawings.

Figure 2:
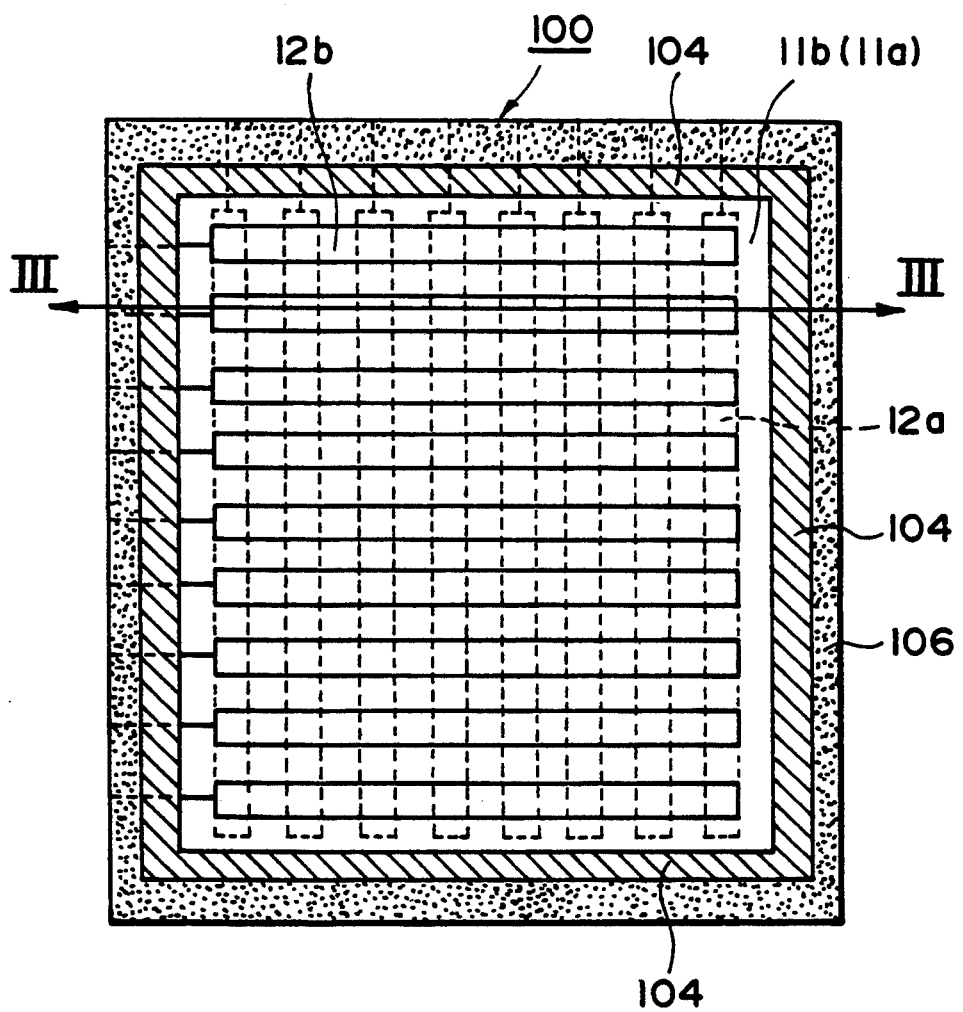
FIG. 2 is a plan view of an example of a ferroelectric liquid crystal device produced through a method of the invention.
Figure 3A:
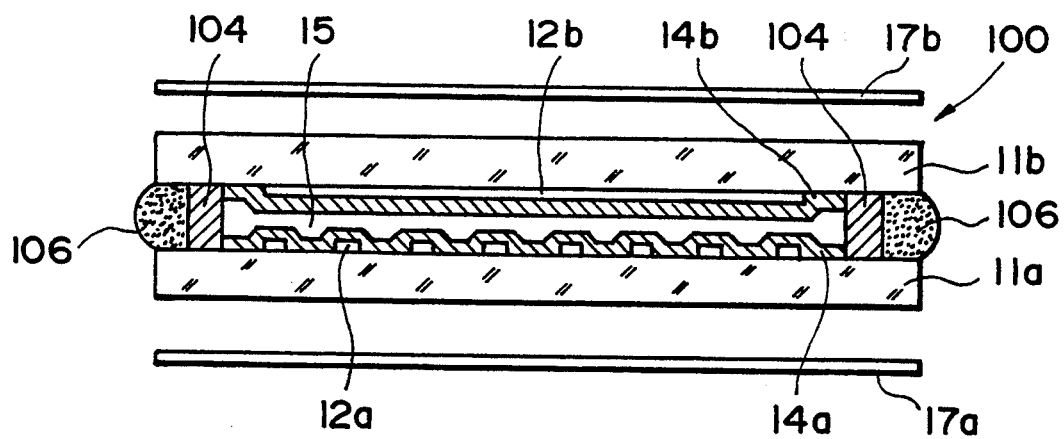
FIGS. 3A–3C are respectively a schematic sectional view of an example of a liquid crystal device having a plan view as shown in FIG. 2 taken along the line III-—III in FIG. 2.
Figure 3B:
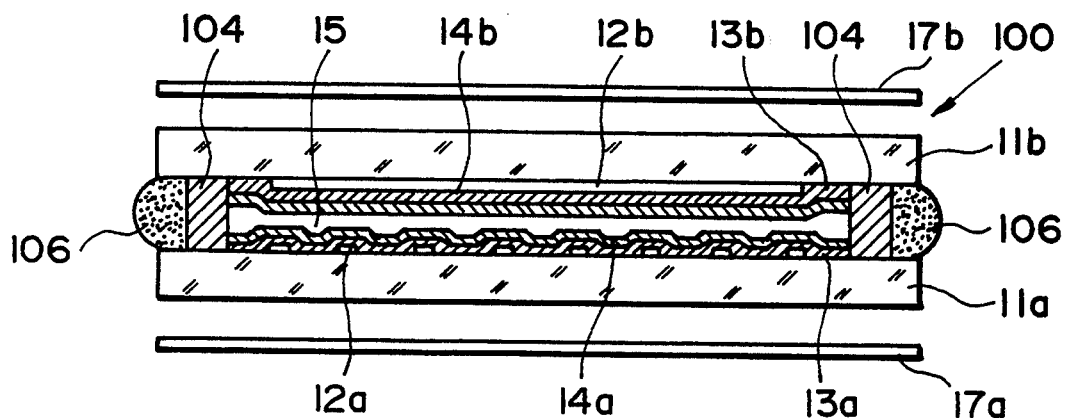
Figure 3C:
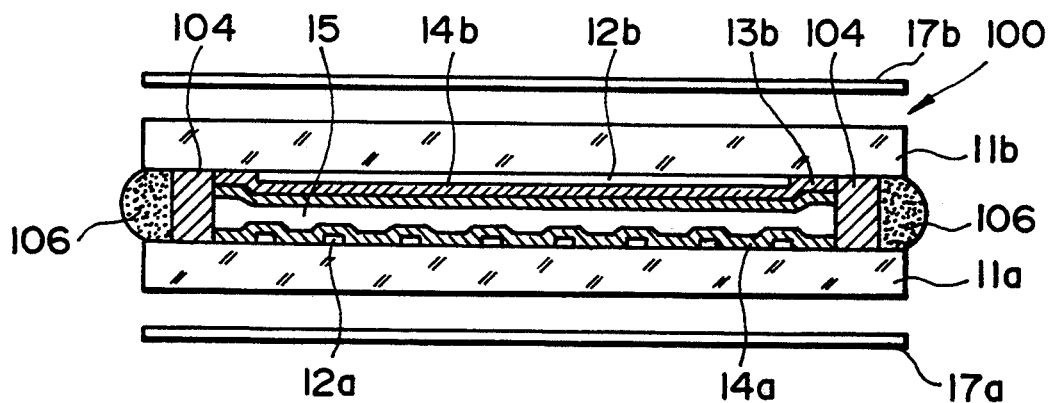

FIG. 2 is a plan view of an embodiment of a liquid crystal device suitably produced through a method according to the present invention and capable of having various sectional views as shown in FIGS. 3A–3C each taken along the line III—III in FIG. 2.

Referring to FIG. 2 and FIGS. 3A–3C, such a liquid crystal device (cell structure) 100 includes a pair of substrates 11a and 11b made of glass plates or plastic plates which are held with a prescribed gap with a spacer 104 and sealed with an adhesive 106 to form a cell structure. On the substrate 11a is further formed an electrode group (e.g., an electrode group for applying a scanning voltage of a matrix electrode structure) comprising a plurality of transparent electrodes 12a in a prescribed pattern of, e.g., stripes. On the substrate 11b is formed another electrode group (e.g., an electrode group for applying signal voltages of the matrix electrode structure) comprising a plurality of transparent electrodes 12b intersecting the above-mentioned transparent electrodes 12a. A liquid crystal 15 is disposed between the substrates 11a and 11b. Such a cell structure 100 is sandwiched between a pair of polarizers 17a and 17b to form a liquid crystal display apparatus.

On at least one of the transparent electrodes 12a and 12b, an insulating film for preventing short circuit may be disposed but is omitted in the embodiment shown in FIG. 3A, so that the transparent electrodes 12a and 12b on the substrates 11a and 11b are directly covered with alignment control films 14a and 14b.

On the other hand, in an embodiment shown in FIG. 3B, the substrates 11a and 11b are respectively provided with insulating films 13a and 13b and alignment control films 14a and 14b, respectively.

Further, in an embodiment shown in FIG. 3C, the substrate 11b is provided with an insulating film 13b for short circuit prevention and an alignment control film 14b, but the substrate 11a is provided with an alignment control film without such an insulating film for short circuit prevention.

The alignment control films 14a and 14b may comprise a film of an inorganic insulating material, such as silicon monoxide, silicon dioxide, aluminum oxide, zirconia, magnesium fluoride, cerium oxide, cerium fluoride, silicon nitride, silicon carbide, and boron nitride: or an organic insulating material, such as polyvinyl alcohol, polyimide, polyamideimide, polyesterimide, polyparaxylylene, polyester, polycarbonate, polyvinyl acetal, polyvinyl chloride, polyamide, polystyrene, cellulose resin, melamine resin, urea resin and acrylic resin. A film of the above-mentioned inorganic insulating material may also function as an insulating film for preventing short circuit. Particularly, the alignment control films 14a and 14b in the liquid crystal device shown in FIG. 3A may suitably be composed of a film of an inorganic insulating material having functions of both alignment control and short circuit prevention. The alignment control films 14a and 14b in the liquid crystal devices shown in FIGS. 3B and 3C may preferably be formed in a thickness of 50 Å-1500 Å.

The alignment control films 14a and 14b, after being formed as films of an inorganic insulating material or an organic insulating material as described above, may be provided with a uniaxial alignment axis by rubbing the films in one direction with a rubbing cloth having pile yarn on its surface.

The insulating films 13a and 13b for short circuit prevention may preferably be formed as a film of an inorganic insulating material, such as $SiO_2$, $TiO_2$, $Al_2O_3$, $Si_3N_4$ and $BaTiO_3$, in a thickness of at least 200 Å, more preferably at least 500 Å.

The films may be formed by sputtering, ion-beam evaporation or application of an organic precursor compound, such as organo-titanium compound, organo-silane compound and organo-aluminum compound, followed by calcination. The organo-titanium compound may include: alkyl (e.g., methyl, ethyl, propyl, butyl, etc.) titanates; and the organo-silane compounds may include ordinary silane coupling agents. If the thickness of the insulating film for short circuit prevention 13a or 13b is below 200 Å, a sufficient short circuit-prevention effect may not be achieved. On the other hand, if the thickness exceeds 5000 Å, an effective voltage application to the liquid crystal is hindered. Accordingly, the thickness may be set to 200-5000 Å, preferably 500-2000 Å.

The alignment control given by the rubbing according to the present invention is particularly effective for a smectic liquid crystal, particularly a ferroelectric smectic liquid crystal, having a delicate alignment characteristic. More specifically, it is possible to use a liquid crystal in chiral smectic C phase (SmC*), chiral smectic G phase (SmG*), chiral smectic F phase (SmF*), chiral smectic I phase (SmI*), or chiral smectic H phase (SmH*).

Details of ferroelectric liquid crystals are described in, e.g., LE JOURNAL DE PHYSIQUE LETTERS, 36 (L-69) 1975, "Ferroelectric Liquid Crystals"; Applied Physics Letters, 36 (11), 1980, "Submicro-Second Bistable Electrooptic Switching in Liquid Crystals"; Kotai Butsuri (Solid State Physics), 16 (141), 1981, "Ekisho (Liquid Crystals)"; U.S. Pat. Nos. 4,561,726; 4,589,996; 4,592,858; 4,596,667; 4,613,209; 4,614,609 and 4,622,165. Ferroelectric liquid crystals disclosed in these references may be used in the present invention.

Specific examples of ferroelectric liquid crystals may include: hexyloxybenzylidene-p'-amino-2-chloropropylcinnamate (HOBACPC), 4-O-(2-methyl)butyl-resorcylidene-4'-octylaniline (MBR8), and a mixture liquid crystal comprising a phenylpyrimidine as a principal component.

Figure 4:
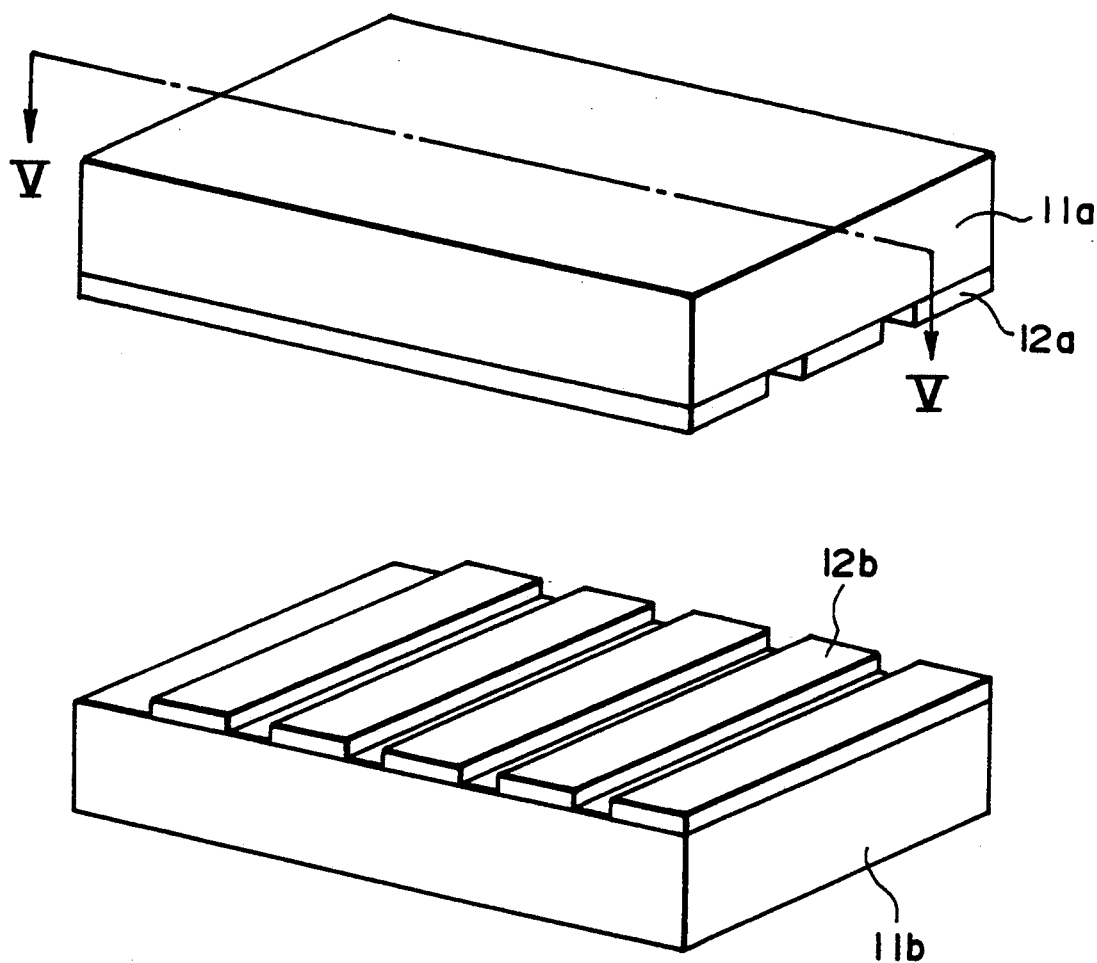
FIG. 4 is a schematic exploded view of an example of a liquid crystal device produced through a method of the invention.

FIG. 4 is a schematic partly broken perspective view of another embodiment of a liquid crystal device suitably produced through a method according to the present invention, and FIG. 5 is a schematic sectional view taken along the line V—V in FIG. 4. Referring to these figures, the liquid crystal device comprises a pair of an upper substrate 11a and a lower substrate 11b having thereon stripe transparent electrodes 12a and 12b, respectively, at about 400-2000 Å in thickness. Between the substrates is disposed a ferroelectric liquid crystal 15, preferably a ferroelectric smectic liquid crystal in a non-helical structure having at least two optically stable states.

Alignment control films 14a and 14b may be disposed on the transparent electrodes 12a and 12b, respectively, optionally by the medium of 200 Å to 3000 Å-thick insulating films 13a and 13b, respectively, of, e.g., $SiO_2$, $TiO_2$ or $Ta_2O_5$. The spacing between the upper and lower substrates 11a and 11b may be held by, e.g., silica beads 16 of about 15. $\mu$m (generally 0.1-3.5 $\mu$m) in average diameter.

The alignment control films 14a and 14b are subjected to a rubbing treatment for aligning the smectic liquid crystal. According to a first embodiment of the present invention, the rubbing treatment is first applied to a substrate having stripe electrodes extending perpendicularly or at an angle closer to the perpendicular to rubbing direction as shown at (a) in FIG. 6 and then to a substrate having stripe electrodes extending parallel to or at an angle closer to the parallel to the rubbing direction as shown at (b) in FIG. 6.

By the above rubbing treatment method, the difference in alignment control force attributable to the difference in extension direction of stripe electrodes with respect to the rubbing direction may be compensated by the difference in alignment control force attributable to the deterioration of the rubbing cloth.

Alternatively, in the present invention, it is also possible to compensate for the difference in alignment control force attributable to the difference in magnitude of stepwise elevation due to the stepwise electrodes or the difference in stripe electrode extension direction relative to the rubbing direction by rubbing the respective substrates at different intensities.

Hereinbelow, specific examples are set forth.

EXAMPLE 1

1.1 mm-thick glass plates each measuring 300 mm×320 mm were provided as substrates and further provided with stripe electrodes of ITO (indium tin oxide), followed by sputtering to provide a 1000 Å-thick $SiO_2$ film as an insulating film for short circuit prevention, and then coating with a polyimide-forming liquid ("LQ 1802", mfd. by Hitachi Kasei K.K.) by spinner and heat-curing at 270° C. for about 1 hour to form a 300 Å-thick polyimide alignment film.

100 substrates were prepared in the above-described manner and then successively subjected to a rubbing treatment by using a cylindrical rubbing roller of 100 mm in diameter provided with a rubbing cloth having nylon pile yarn applied thereabout. During the rubbing treatment, the rubbing roller moving speed was successively lowered from the initial speed of 60 mm/sec at a rate of 0.5 mm/sec for each substrate while keeping a rubbing roller rotation speed at 1000 rpm and a pressing depth of the rubbing roller (i.e., of the pile yarn) at 0.30 mm for 2 mm-long pile yarn.

Then, 5 pairs of the substrates thus subjected to rubbing, i.e., the 1st and 2nd substrates, 9th and 10th substrates, 29th and 30th substrates, 59th and 60th substrates, and 99th and 100th substrates, were respectively applied to each other with alumina spacer beads having an average diameter of about 1.5 μm disposed therebetween so that their rubbing directions were parallel to each other to form 5 cells.

Then, each of the five cells was filled with a mixture liquid crystal containing a phenylpyrimidine as a principal constituent and, after sealing, was cooled for alignment from 87° C. to room temperature at a rate of 1° C./min, to form a liquid crystal cell. The mixture liquid crystal shows the following phase transition:

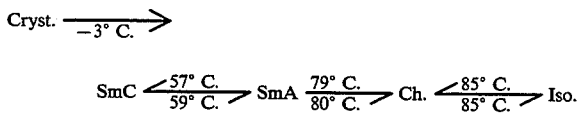

The alignment characteristics of the five liquid crystal cells thus prepared were evaluated by observation through a polarizing microscope, whereby good alignment state with no defect was observed in each cell.

Further, by using substrates prepared and treated in the same manner as the substrates used for the above-mentioned cell preparation and performance evaluation, 5 cells for measurement of a pretilt angle (i.e., an angle of liquid crystal molecules at a substrate surface with respect to the substrate surface) were prepared and used for pretilt angle measurement. The pretilt angle measurement was performed in the following manner.

Measurement of pretilt angle α

The measurement was performed according to the crystal rotation method as described at Jpn. J. Appl. Phys. vol. 19 (1980), No. 10, Short Notes 2013.

More specifically, a pair of substrates rubbed in mutually parallel and opposite directions were applied to each other to form a cell having a cell gap of 20 μm, which was then filled with a liquid crystal mixture assuming SmA phase in the temperature range of 0°-60° C. obtained by mixing a ferroelectric liquid crystal ("CS-1014", mfd. by Chisso K.K.) with 20 wt. % of a compound represented by the following formula:

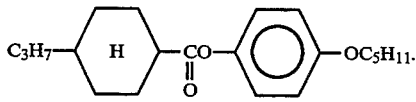

For measurement, the liquid crystal cell was rotated in a plane perpendicular to the pair of substrates and including the aligning treatment axis and, during the rotation, the cell was illuminated with a helium-neon laser beam having a polarization plane forming an angle of 45 degrees with respect to the rotation plane in a direction normal to the rotation plane, whereby the intensity of the transmitted light was measured by a photodiode from the opposite side through a polarizer having a transmission axis parallel to the polarization plane.

An angle $\phi_x$ between the incident beam direction and a normal to the cell for providing the central point of a family of hyperbolic curves in the interference figure thus obtained was substituted in the following equation to find a pretilt angle $\alpha_o$, $$\sin 2\alpha_o = \frac{-2\sin\phi_x}{(n_o + n_w)\sqrt{1 - (\sin\phi_x/n_o)^2}}$$

wherein $n_o$ denotes the refractive index of ordinary ray, and $n_e$ denotes the refractive index of extraodinary ray.

Figure 7:
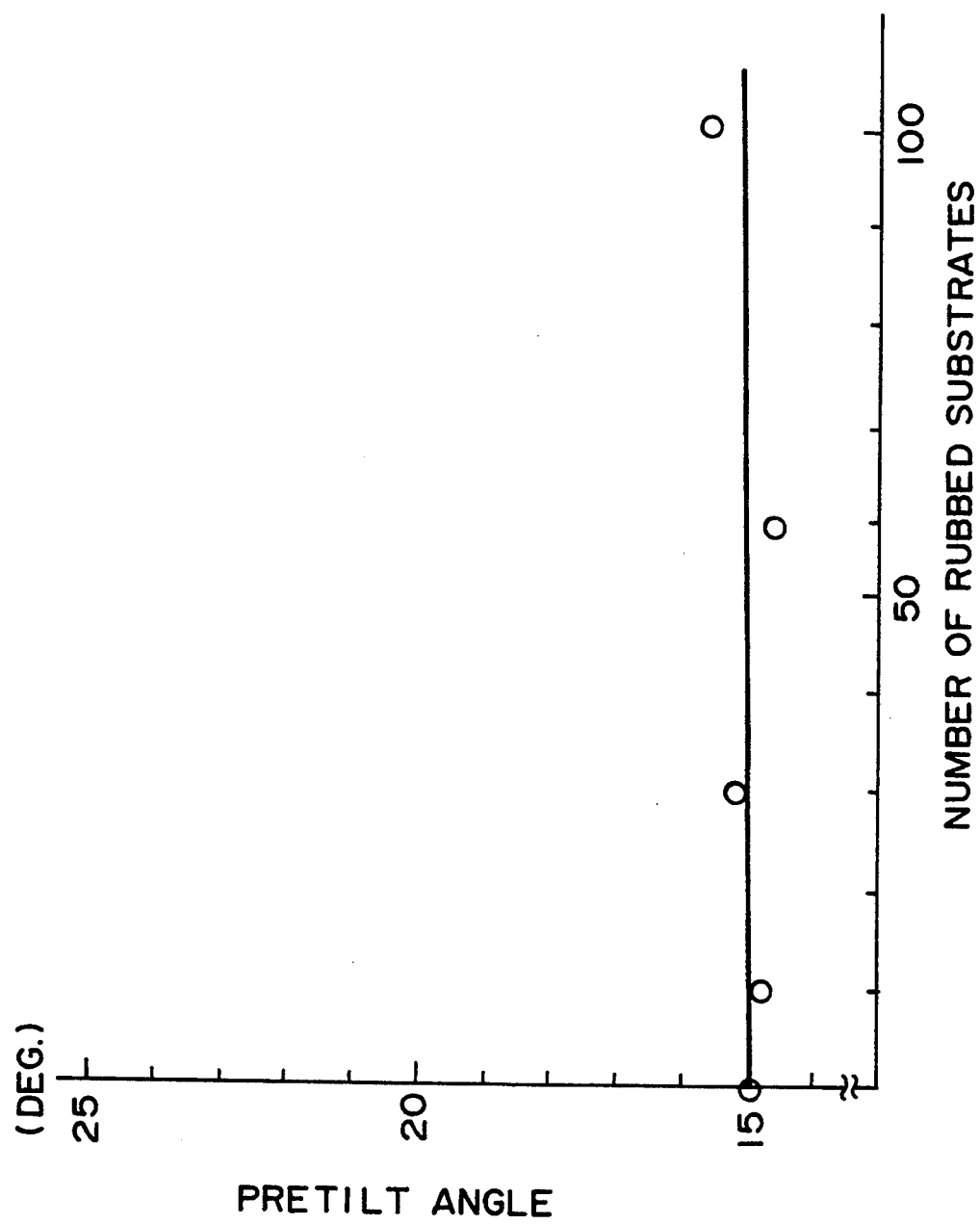
FIGS. 7 and 8 are graphs showing results of pretilt angle measurement in Example 1 and Comparative Example 1, respectively.

The results of the pretilt angle measurement are shown in FIG. 7.

Comparative Example 1

For comparison, 100 substrates each provided with a polyimide alignment film were prepared in the same manner as in Example 1 and then successively subjected to a rubbing treatment in the same manner as in Example 1 except that the rubbing roller moving speed was fixed at 60 mm/sec.

Then, similarly as in Example 1, 5 pairs of the substrates thus subjected to rubbing, i.e., the 1st and 2nd substrates, 9th and 10th substrates, 29th and 30th substrates, 59th and 60th substrates, and 99th and 100th substrates, were taken out and used to form 5 liquid crystal cells in the same manner as in Example 1 by using the same liquid crystal mixture principally comprising a phenylpyrimidine as in Example 1.

The alignment characteristics of the five liquid crystal cells thus prepared were evaluated by observation through a polarizing microscope. The results are shown in the following Table 1 together with those in Example 1.

TABLE 1

| Cell/substrate | 1st & 2nd | 9th & 10th | 29th & 30th | 59th & 60th | 99th & 100th |
|---|---|---|---|---|---|
| Example 1 | ○ | ○ | ○ | ○ | ○ |
| Comp. Example 1 | ○ | ○ | ○ | Δ-x | x |

The symbols denote the following states respectively.
○: Good alignment and no defect.
Δ-x: Uniaxial alignment was partially lost.
x: Many defects. Uniaxial alignment was lost at about 40% of the entire area.

Figure 8:
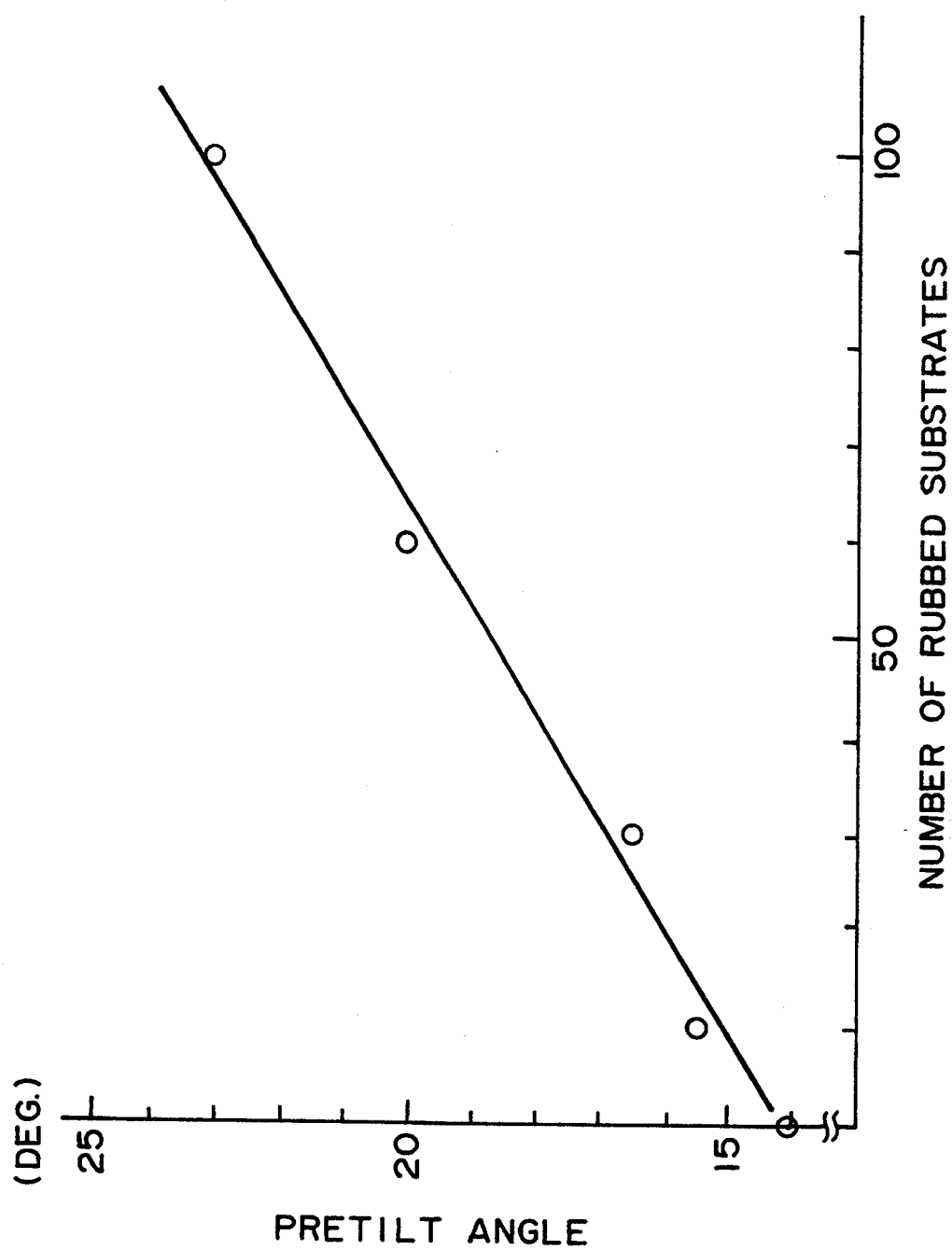

Similarly, by using separately prepared substrates corresponding to those used in the above cell preparation and performance evaluation, 5 additional cells were prepared and used or pretilt angle measurement in the same manner as in Example 1. The results are shown in FIG. 8.

From the comparison between Example 1 and Comparative Example 1, it is understood that it is possible to treat a larger number of substrates by rubbing without causing a decrease in uniaxial alignment control force if the rubbing is performed while changing the moving speed of the rubbing roller so as to suppress the change in pretilt angle (i.e., the angle of liquid crystal molecules at a substrate surface with respect to the substrate surface).

EXAMPLE 2

In the previous Example 1, the rubbing roller moving speed was changed so that the contact time was gradually increased. In order to obviate this, the rotational speed of the rubbing roller was changed in this example.

More specifically, 100 substrates each provided with a polyimide alignment film were prepared in the same manner as in Example 1 and then successively subjected to a rubbing treatment under a fixed rubbing roller moving speed of 30 mm/sec and a fixed rubbing roller pressing depth of 0.30 mm while increasing the rubbing roller rotational speed from the initial speed of 500 rpm at an increment of 15 rpm for each substrate.

Then, 5 pairs of substrates were selected on the same conditions as in Example 1 and used to prepare 5 cells in the same manner as in Example 1. The 5 cells were evaluated with respect to alignment characteristic in the same manner as in Example 1, whereby no defects were observed in any of the cells similarly as in Example 1. Further, the pretilt angle measurement was performed similarly as in Example 1 whereby no substantial change in pretilt angle was observed with respect to the five cell samples.

Comparative Example 2

For comparison, 100 substrates each provided with a polyimide alignment film were prepared in the same manner as in Example 2 and then successively subjected to a rubbing treatment in the same manner as in Example 2 except that the rubbing roller rotational sped was fixed at 1000 rpm.

Then, 5 pairs of substrates were selected on the same conditions as in Example 1 and used to prepare 5 cells in the same manner as in Example 1. The 5 cells were evaluated with respect to alignment characteristic in the same manner as in Example 1, whereby similar results as Comparative Example 1 shown in the above Table 1 were observed.

Further, by using 5 pairs of substrates prepared and selected in the same manner as above for the cell preparation, the pretilt angle measurement was performed in the same manner as in Example 1, whereby similar results as shown in FIG. 8 with respect to Comparative Example 1 were obtained.

From the Comparison between Example 2 and Comparative Example 2, it is understood that similar effects as in Example 1 are obtained by a rubbing treatment while changing the rotational speed of the rubbing roller.

EXAMPLE 3

100 substrates each provided with a polyimide alignment film were prepared in the same manner as in Example 1 and then successively subjected to a rubbing treatment under a fixed rubbing roller moving speed of 30 mm/sec and a fixed rubbing roller rotational speed of 1000 rpm while increasing the rubbing roller pressing depth from the initial value of 0.30 mm at an increment of 0.01 mm for each 4 substrates.

Then, 5 pairs of substrates were selected on the same conditions as in Example 1 and used to prepare 5 cells in the same manner as in Example 1. The 5 cells were evaluated with respect to alignment characteristic in the same manner as in Example 1, whereby no defects were observed in any of the cells similarly as in Example 1. Further, the pretilt angle measurement was performed similarly as in Example 1 whereby no substantial change in pretilt angle was observed with respect to the five cell samples.

From the Comparison between Example 3 and Comparative Example 2, it is understood that similar effects as in Example 1 are obtained by a rubbing treatment while changing the pressing depth of the rubbing roller.

EXAMPLE 4

200 substrates each provided with a polyimide alignment film were prepared in the same manner as in Example 1 and then successively subjected to a rubbing treatment while decreasing the rubbing roller moving speed from the initial value of 60 mm/sec at a rate of 0.1 mm/sec for each substrate, increasing the roller rotational speed from the initial value of 1000 rpm at a rate of 5 rpm for each substrate, and increasing the roller pressing depth from the initial value of 0.30 mm at a rate of 0.01 mm for each 10 substrates.

Then, 5 pairs among the substrates thus subjected to rubbing, i.e., the 1st and 2nd substrates, 49th and 50th substrates, 99th and 100th substrates, 149th and 150th substrates, and 199th and 200th substrates, were selected and used for preparing 5 cells otherwise in the same manner as in Example 1.

The alignment characteristics of the five liquid crystal cells thus prepared were evaluated by observation through a polarizing microscope, whereby good alignment state with no defect was observed in each cell. The results are summarized in the following Table 2.

TABLE 2

| Cell/substrate | 1st & 2nd | 49th & 50th | 99th & 100th | 149th & 150th | 199th & 200th |
| --- | --- | --- | --- | --- | --- |
| Example 1 | o | o | o | o | o |

Further, by using 5 pairs of substrates separated prepared and selected on the same conditions above for the cell preparation, the pretilt angle measurement was performed in the same manner as in Example 1, whereby no substantial change in pretilt angle was observed among the five cells.

As is understood from the comparison between the above results of Example 4 and those of Comparative Example 1 as shown in Table 1 above, it is possible to treat a large number of substrates which is even larger than those in Examples 1-3 if the roller moving speed, roller rotational speed and roller pressing are simultaneously varied.

EXAMPLE 5

Figure 9:
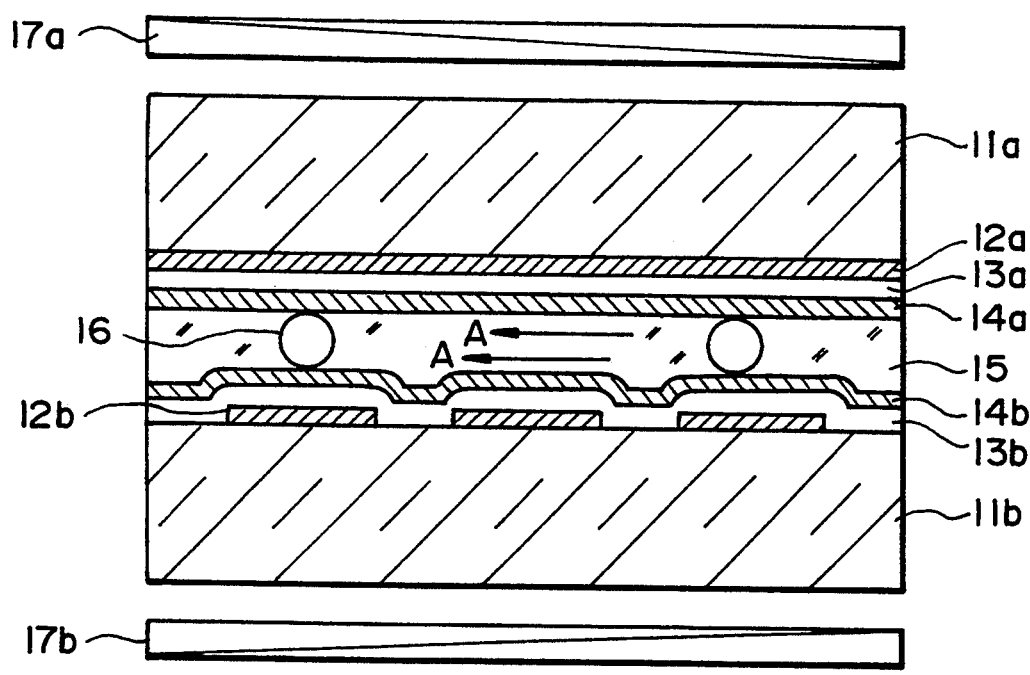
FIG. 9 is a schematic sectional view of another example of a liquid crystal device having a plan view as shown in FIG. 2 taken along the line III—III in FIG. 2.

FIG. 9 is a sectional view of another example of a liquid crystal device having a plan view as shown in FIG. 2 taken along the line III—III in FIG. 2.

Referring to FIG. 2, the liquid crystal device comprises a pair of substrates (glass plates) 11a and 11b which are coated with transparent electrodes 12a and 12b of $In_2O_3$, ITO (indium tin oxide), etc., 200–300 Å-thick insulating films 13a and 13b of $SiO_2$, $TiO_2$, $Ta_2O_5$, etc., and 50–100Å-thick alignment control films 14a and 14b.

In this instance, the alignment control films 14a and 14b have been treated by rubbing in directions which are parallel to each other and in the same direction (indicated by arrows A in FIG. 9). A chiral smectic liquid crystal 15 is disposed between the substrates 11a and 11b, and the spacing between the substrates 11a and 11b is set to provide the liquid crystal layer 15 with a thickness (e.g., 0.1–3 microns) which is sufficiently small to suppress the formation of a helical structure of the chiral smectic liquid crystal 15 by disposing spacer beads 16 of, e.g., silica, alumina, etc. between the substrates 11a and 11b, whereby the chiral smectic liquid crystal 15 assumes a bistable alignment state.

In the above arrangement, it is possible to form a uniform alignment state of a good quality by providing an accurately controlled pretilt angle of liquid crystal molecules on the alignment control layer surface in view of a microscopic structure of a chiral smectic liquid crystal. The alignment state is explained with reference to some model views.

Figure 10:
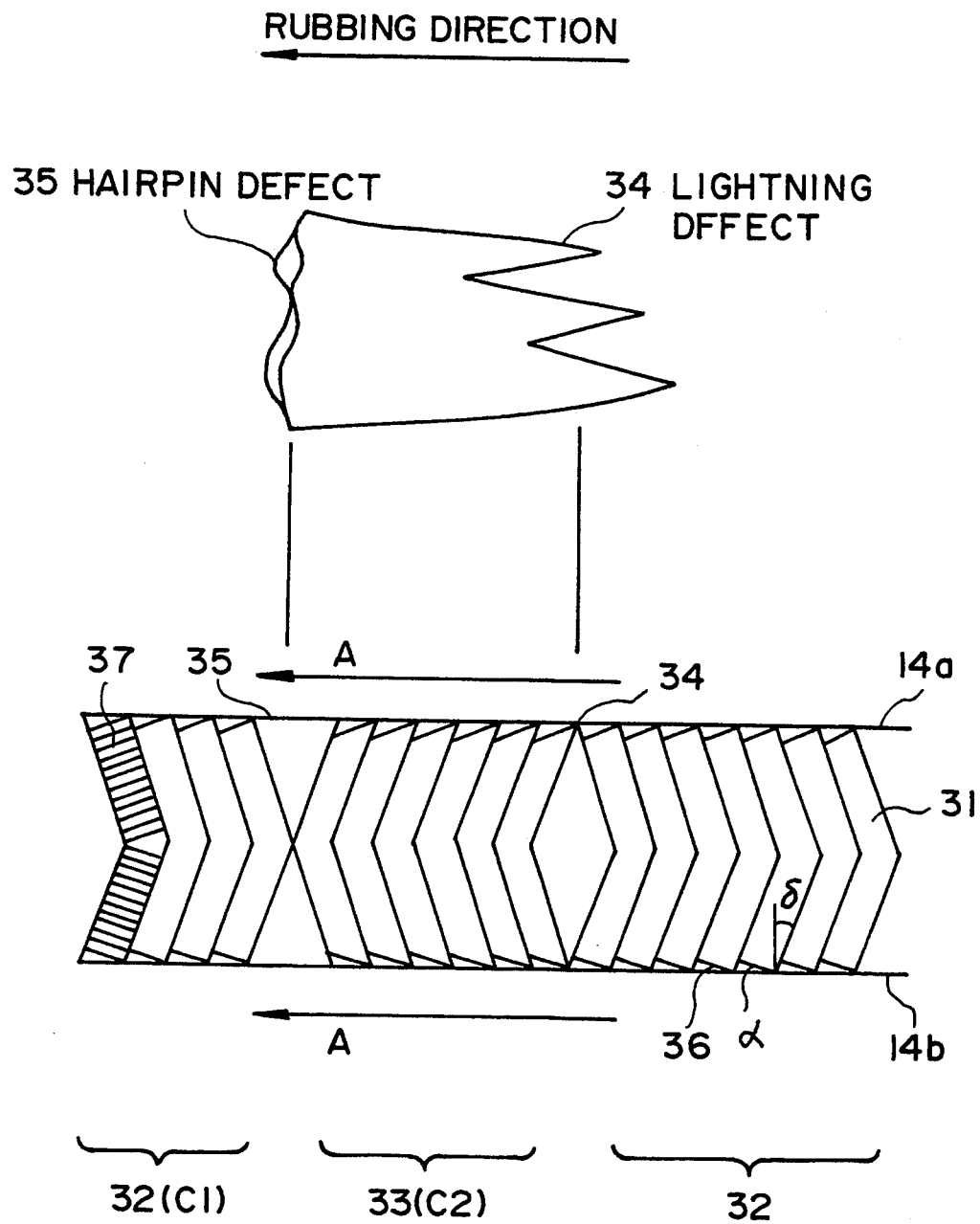
FIG. 10 is a schematic view for illustrating a difference between C1 and C2 alignment states.

FIG. 10 illustrates a chevron structure of a chiral smectic liquid crystal including a C1 alignment smectic liquid crystal including a C1 alignment state (Sm*C1) and a C2 alignment state (Sm*C2). More specifically, a chiral smectic liquid crystal frequency assumes a chevron structure as shown in FIG. 10 including one or both of two types of chevrons 32 and 33 (which may be also referred to as Sm*C1 and Sm*C2, respectively) having mutually different azimuth angles corresponding to the rubbing direction. Each chevron 32 or 33 includes a plurality of smectic layers 31 which is inclined at an angle $\delta$ with respect to the normal to the alignment surface 14a or 14b and in turn comprises a plurality of liquid crystal molecules 37, among which liquid crystal molecules 36 adjacent to the alignment surface 14a or 14b shows a pretilt angle $\alpha$ with respect to the alignment surface corresponding to the one measured in SmA phase.

At boundaries 34 and 35 between the chevrons having different inclination angles, where are formed a lightening defect and a hairpin defect, respectively, which are inclusively referred to as zigzag defects. In the present invention, an alignment state comprising a chevron 32 (Sm*C1) may be formed and used.

Figure 11B:
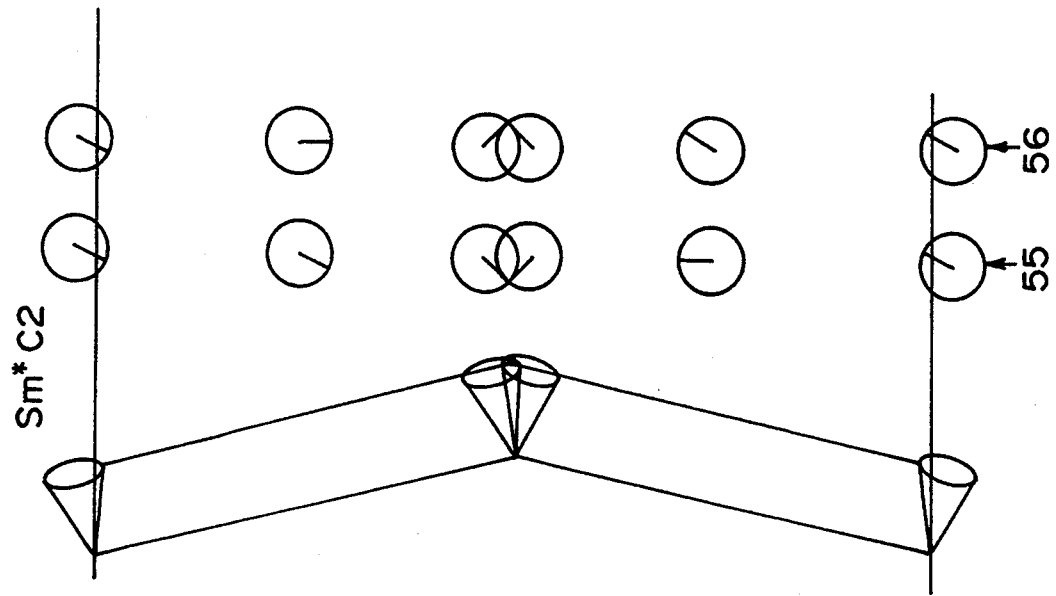
FIGS. 11A and 11B are schematic sectional view showing C director alignments between the substrates in C1 and C2 alignment states, respectively.
Figure 11A:
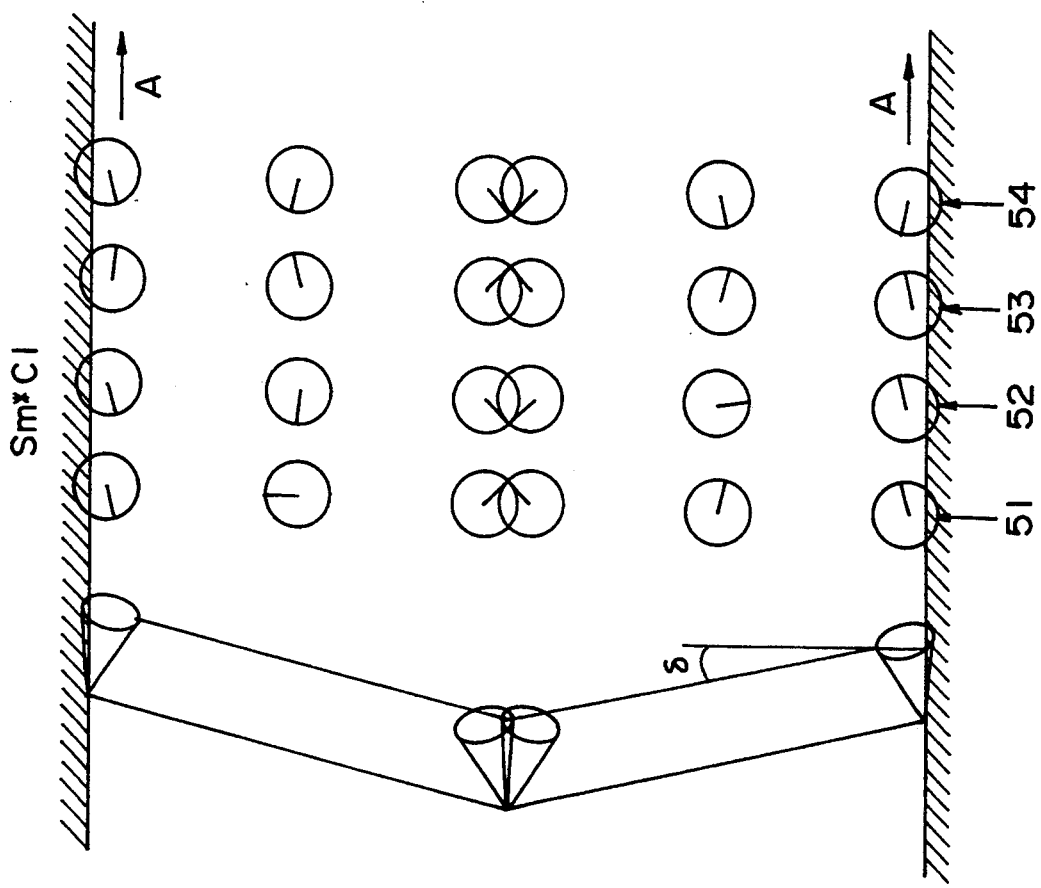

FIGS. 11A and 11B show changes in C-directors between substrates in Sm*C1 and Sm*C2 respectively, wherein the alignment at 51 and 52 in combination represents a twist state in C1 alignment, the alignment at 53 and 54 in combination represents a uniform state in C1 alignment, and the alignment at 55 and 56 in combination represents a twist state in C2 alignment.

According to our study, C2 alignment is preferentially formed in case of a small pretilt angle, and C1 alignment is stabilized at a larger pretilt angle to develop a uniform state as shown at 53 and 54 in FIG. 11A. However, too large a pretilt angle stabilizes a twist state in C1 as shown at 51 and 52, which results in a remarkably inferior contrast when used as a display. As is understood from the above explanation, accurate control of a pretilt angle is very critical in providing a ferroelectric liquid crystal device of excellent performances.

In a specific example, a ferroelectric liquid crystal device was prepared in the following manner.

A glass substrate provided with transparent electrodes was coated with a tantalum oxide film formed by sputtering and then coated with a coating-type insulating layer ("Ti-SiMOF", mfd. by Tokyo Ohka K.K.), followed by heating at 300° C. to form a 1000 Å-thick oxide film. Then, a polyimide forming solution ("LQ 1802", mfd. by Hitachi Kasei K.K.) was applied by spinner coating and then heated for curing at 270° C. for 1 hour to form a 300 Å-thick polyimide alignment film. Further, 40 sheets of the above-treated substrate were subjected to a rubbing treatment under a fixed roller pressing depth of 0.3 mm and a fixed rotational speed of 1000 rpm while decreasing the roller moving speed at a rate of 1 mm/sec for each substrate from the initial value of 70 mm/sec. Each substrate thus treated was cut into four equal quarters, of which two were applied to each other so that their rubbing directions were parallel and opposite to form a cell for pretilt angle measurement, and the remaining two sheets were applied each other so that their rubbing directions were parallel and the same to prepare a cell for evaluation of alignment characteristic. The results of the pretilt angle measurement are shown in FIG. 12, whereby the pretilt angle was in the range of 16.2–17.5 degrees and not substantially changed by the order of the rubbing treatment. The respective cells also provided a uniform uniform alignment.

Comparative Example 3

The experimental procedure of Example 5 above was repeated except that the roller moving speed was fixed at 50 mm/sec in the rubbing treatment.

Figure 13:
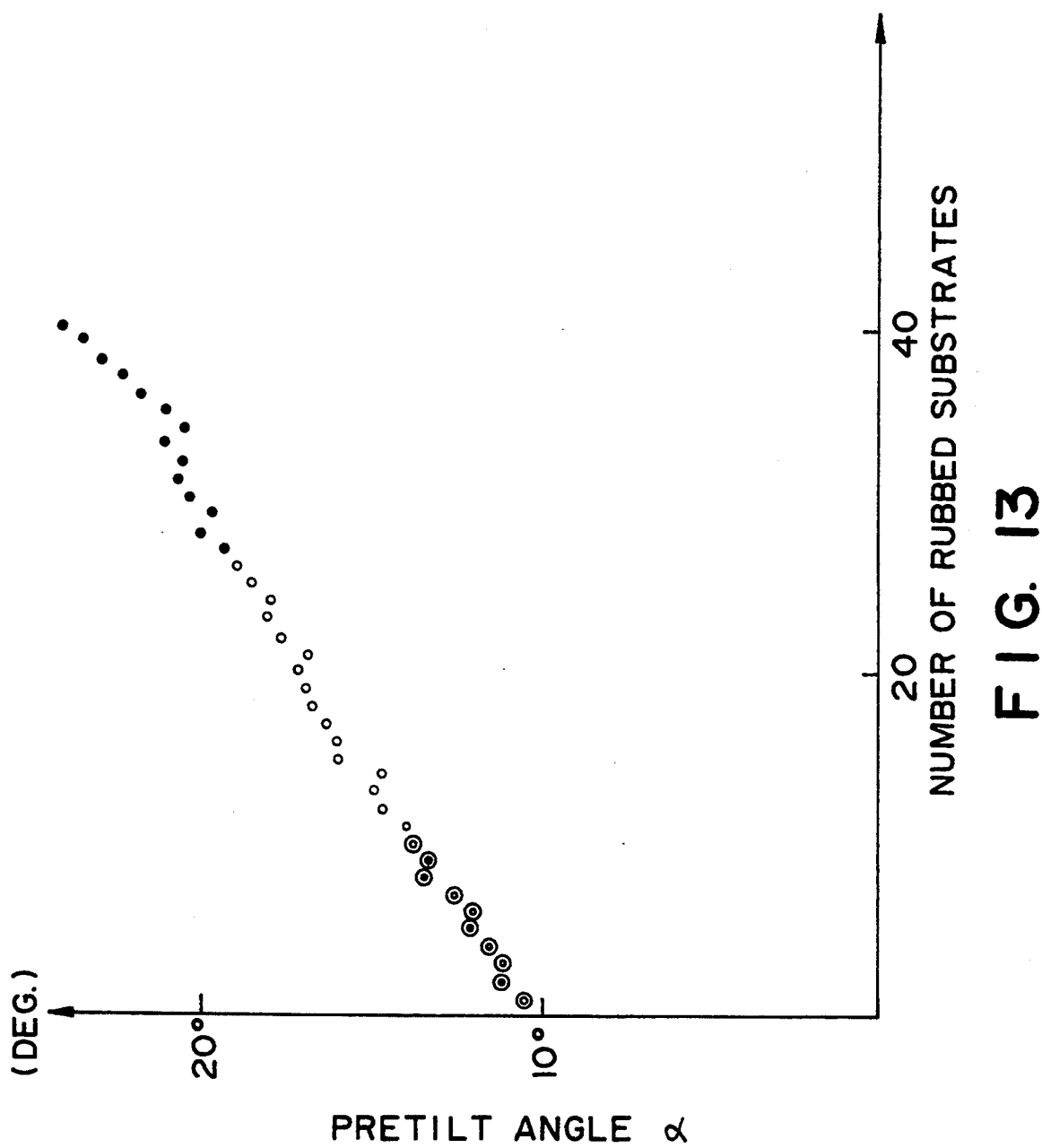

The results of the pretilt angle measurement are shown in FIG. 13. As shown in FIG. 13, the pretilt angle remarkably changed from 10.5 degrees to 24 degrees. Moreover, in the cells corresponding to black spots • in the figure, twist alignment in Sm*C1 appeared to provide a much inferior contrast. Further, in the cells corresponding to double-circle spots ⊙, Sm*C2 alignment appeared to four defects at boundaries with C1 alignment region, thus resulting in image quality deterioration, such as flicker and a lower contrast.

EXAMPLE 6

Referring to FIG. 5, two 1.1 mm-thick glass substrates 11a and 11b were provided with 2000 Å-thick ITO stripe electrodes 12a and 12b, covered with 1000 Å-thick insulating films 13a and 13b of $SiO_2$ for short circuit prevention formed by sputtering and then coated with a polyimide forming solution ("LQ 1802"), followed by heat-curing to form 300 Å-thick polyimide alignment films 14a and 14b.

A pair of substrates treated above were subjected to a rubbing treatment with a rubbing cloth comprising nylon pile yarn in such a manner that one substrate was rubbed in a direction perpendicular to the stripe electrode extension and the other substrate was rubbed in a direction parallel to the stripe electrode extension. In this way, the rubbing treatment was continued to treat totally 10 pairs of substrates. Then, 1.5 μm-silica beads were dispersed on one substrate in each pair, an adhesive sealant was applied onto the other substrate, and these two substrates were applied to each other so that their rubbing directions were parallel and the same and their stripe electrodes crossed each other to prepare totally 10 panels (referred to as No. 1–No. 10 panels in the order of the rubbing treatment). The respective panels were filled with a mixture ferroelectric liquid crystal principally comprising a phenylpyrimidine.

Then, each panel was sandwiched between cross nicol polarizers and subjected to application of 20 V-rectangular pulses while varying the pulse width thereof for measurement of threshold value (pulse width) for switching from "white" to "black" (W→B) and then to application of 20 V-rectangular pulses of the opposite polarity to measure the threshold value for switching from "black" to "white" (B→W). The results are shown in Table 3 appearing hereinafter.

Comparative Example 4

10 pairs of substrates each provided with a polyimide alignment film were prepared in the same manner as in Example 6 and successively subjected to a rubbing treatment in the same manner as in Example 6 except that one substrate in each pair was rubbed in a direction parallel to the stripe electrode extension and then the other was rubbed in a direction perpendicular to the stripe electrode extension. Then, 10 panels (referred to as No. 1'-No. 10' panels in the order of the rubbing treatment) were prepared by using the ten pairs of substrates thus treated and then subjected to measurement of the W→B and B→W threshold values (pulse widths) in the same manner as in Example 6. The results are shown in Table 4.

TABLE 3

Threshold value (Example 6) (pulse width in μsec)

| | Panel No. (order of rubbing) | | | | | | | | | |
|---|---|---|---|---|---|---|---|---|---|---|
| | 1 | 2 | 3 | 4 | 5 | 6 | 7 | 8 | 9 | 10 |
| White (W)→Black (B) (μs) | 27.0 | 26.8 | 26.7 | 26.8 | 26.6 | 26.5 | 26.3 | 26.3 | 26.0 | 26.1 |
| Black (B)→White (W) (μs) | 26.5 | 26.4 | 26.5 | 26.9 | 26.6 | 26.2 | 26.1 | 26.4 | 26.5 | 26.3 |

TABLE 4

Threshold value (Comp. Example 4) (pulse width in μsec)

| | Panel No. (order of rubbing) | | | | | | | | | |
|---|---|---|---|---|---|---|---|---|---|---|
| | 1' | 2' | 3' | 4' | 5' | 6' | 7' | 8' | 9' | 10' |
| White (W)→Black (B) (μs) | 27.4 | 27.3 | 26.5 | 26.7 | 25.9 | 26.0 | 25.5 | 25.2 | 24.9 | 24.8 |
| Black (B)→White (W) (μs) | 35.2 | 35.3 | 34.8 | 34.7 | 34.5 | 33.9 | 33.7 | 33.3 | 33.0 | 32.9 |

In view of the above Table 3 (Example 6) and Table 4 (Comparative Example 4), the respective panels in Example 6 using an order of rubbing of perpendicular→parallel with respect to the stripe electrode extension did not provide a substantial difference between W→B and B→W threshold values, whereas the respective panels in Comparative Example 4 using an order of rubbing of parallel→perpendicular with respect to the electrode extension resulted in a remarkable difference between W→B and B→W switching threshold values.

A similar effect of alleviating the difference in rubbing effect due to a difference in rubbing direction relative to the electrode extension may be accomplished by using different rubbing conditions between the two types of substrates.

More specifically, it is appropriate to vary the roller rotational speed, roller pressing depth and relative moving speed between the roller and the substrate. For example, for a substrate having stripe electrodes extending parallel to the roller axis, it is appropriate to increase the rotation speed or pressing depth, decrease the relative moving speed, or combine some of these measures, so as to provide a good aligning treatment while minimizing the effect of difference in stripe electrode extension.

Further, a more uniform aligning treatment may be effected by varying the aligning treatment conditions corresponding to the progress of the aligning treatment, i.e., the increase in number of treated substrates, in order to select an appropriate order of aligning treatment for a pair of substrates having different stripe electrode extensions relative to the rubbing direction.

In varying the aligning treatment conditions with the progress of the aligning treatment, it may be possible to change the conditions for each substrate (or each pair of substrates), or for every plural substrates 1 or every several pairs of substrates. It is also possible to vary the increment or decrement of the condition concerned depending on the number of substrates treated.

It is further possible to vary an aligning treatment condition from the initial to the last of one substrate, e.g., when the substrate is large.

The change in aligning treatment condition may be performed stepwise or linearly, but it is generally preferred to change the aligning treatment condition after completing the treatment of each substrate (or each pair of substrates) so as to uniformize the aligning treatment condition for each substrate (or each pair of substrates).

As described hereinabove in the rubbing step, in the process of producing ferroelectric liquid crystal devices, a pair of substrates having stripe electrodes extending in different directions relative to the rubbing direction applied thereto may be provided with an equal alignment control force by selecting an appropriate order of rubbing and/or applying different intensities of rubbing to the substrates.

More specifically, according to the present invention, a difference in alignment control force due to a difference in stripe electrode extension on a pair of substrates relative to the rubbing direction may be compensated with a difference in alignment control force attributable to deterioration of the rubbing clothing or by applying different intensities of rubbing to the pair of substrates.

In this way, by providing a pair of substrates with an equal alignment control force, it is possible to remove a difference in threshold value for switching in two directions between two optically stable states, thus being able to provide a ferroelectric liquid crystal device of good bistability characteristic.

Further, by changing a rubbing condition corresponding to the number of substrates treated, the decrease in uniaxial alignment control force due to deterioration or wearing of the pile yarn may be compensated and prevented with the change in rubbing condition.

Further, in the rubbing treatment according to the present invention, it is possible to suppress the change in pretilt angle (i.e., angle of liquid crystal molecules at or adjacent to a substrate surface with respect to the substrate surface) by varying the rubbing roller moving speed, rotational speed or pressing depth against the substrate singly or in combination, whereby a larger number of substrates can be treated by rubbing without weakening the uniaxial alignment control force.

What is claimed is:

1. An aligning treatment method for a liquid crystal device including a liquid crystal between a pair of substrates, comprising successively rubbing a plurality of substrates with a rubbing roller while varying a feeding speed of the rubbing roller with time, wherein the feeding speed of the rubbing roller is varied by at least 0.5% per substrate.

2. An aligning treatment method for a liquid crystal device including a liquid crystal between a pair of substrates, comprising successively rubbing a plurality of substrates with a rubbing roller while varying a feeding speed of the rubbing roller with time, wherein the feeding speed of the rubbing roller is varied by at least 1% per substrate.

3. A method according to claim 1 or 2, wherein a rotational speed and/or a pressing depth against the substrate of the rubbing roller is additionally varied with time.

4. A method according to claim 3, wherein the rubbing roller pressing depth is varied by at least 1% per substrate.

5. A method according to claim 1 or 2, wherein said liquid crystal is a ferroelectric liquid crystal.

6. A method according to claim 5, wherein the substrates are rubbed to align the ferroelectric liquid crystal at a pretilt angle of at least 10 degrees.

7. A method according to claim 1 or 2, wherein the feeding speed of the rubbing roller is varied stepwise.

8. A method according to claim 1 or 2, wherein the feeding speed of the rubbing roller is varied linearly.

9. An alignment treatment method for a liquid crystal device including a pair of substrates each provided with stripe electrodes and a liquid crystal disposed between the substrates; the method comprising rubbing the pair of substrates with a rubbing roller such that one substrate having stripe electrodes extending in a direction perpendicular to the rubbing direction is rubbed first, and then the other substrate having stripe electrodes extending in a direction parallel to the rubbing direction is rubbed, wherein the rubbing is repeated while varying a feeding speed of the rubbing roller with time, and a feeding speed of the rubbing roller is varied by at least 0.5% per substrate.

10. An aligning treatment method for a liquid crystal device including a pair of substrates each provided with stripe electrodes and a liquid crystal disposed between the substrates; the method comprising rubbing the pair of substrates with a rubbing roller such that one substrate having stripe electrodes extending in a direction perpendicular to the rubbing direction is rubbed first, and then the other substrate having stripe electrodes extending in a direction parallel to the rubbing direction is rubbed, wherein the rubbing is repeated while varying a feeding speed of the rubber roller with time, and a feeding speed of the rubbing roller is varied by at least 1% per substrate.

11. A method according to claim 9 or 10, wherein the rubbing is repeated for other pairs of substrates.

12. A method according to claim 9 or 10, wherein said liquid crystal is a ferroelectric liquid crystal.

13. A method according to claim 12, wherein the substrates are rubbed to align the ferroelectric liquid crystal at a pretilt angle of at least 10 degrees.

14. A method according to claim 9 or 10, wherein a rotational speed and/or a pressing depth against the substrate of the rubbing roller is additionally varied with time.

15. A method according to claim 14, wherein the rubbing roller pressing depth is varied by at least 1% per substrate.

16. A method according to claim 9 or 10, wherein the feeding speed of the rubbing roller is varied corresponding to the number of substrates or the number of pairs of substrates treated.

17. A method according to claim 9 or 10, wherein the feeding speed of the rubbing roller is varied stepwise.

18. A method according to claim 9 or 10, wherein the rubbing condition is varied linearly.

19. An aligning treatment method for a liquid crystal device including a pair of substrates each provided with stripe electrodes and a liquid crystal disposed between the substrates; the method comprising rubbing the pair of substrates at different rubbing intensities.

20. A method according to claim 19, wherein the difference in rubbing intensity is given by varying one or more of a feeding speed, a rotational speed and a pressing depth against the substrate of a rubbing roller.

21. A method according to claim 20, wherein the rubbing roller feeding speed is varied by at least 0.5% per substrate.

22. A method according to claim 20, wherein the rubbing roller rotational speed is varied by at least 1% per substrate.

23. A method according to claim 20, wherein the rubbing roller pressing depth is varied by at least 1% per substrate.

24. A method according to claim 20, wherein the rubbing intensity is varied stepwise.

25. A method according to claim 20, wherein the rubbing intensity is varied linearly.

26. A method according to claim 19, wherein said liquid crystal is a ferroelectric liquid crystal.

27. A method according to claim 26, wherein the substrates are rubbed to align the ferroelectric liquid crystal at a pretilt angle of at least 10 degrees.

28. A method according to claim 19, wherein the rubbing intensity is varied further corresponding to the number of pairs of substrates treated.

29. A method according to claim 28, wherein the further variation in rubbing intensity is given by one or more of a feeding speed, a rotational speed and a pressing depth against the substrate of a rubbing roller.

30. A method according to claim 29, wherein the rubbing roller feeding speed is varied by at least 0.5% per substrate.

31. A method according to claim 29, wherein the rubbing roller rotational speed is varied by at least 1% per substrate.

32. A method according to claim 29, wherein the rubbing roller pressing depth is varied by at least 1% per substrate.

33. A method according to claim 29, wherein the rubbing intensity is varied stepwise.

34. A method according to claim 29, wherein the rubbing intensity is varied linearly.

* * * * *

UNITED STATES PATENT AND TRADEMARK OFFICE
CERTIFICATE OF CORRECTION

PATENT NO. : 5,353,141

DATED : October 4, 1994

INVENTOR(S) : KENJI ONUMA, ET AL.

It is certified that error appears in the above-identified patent and that said Letters Patent is hereby corrected as shown below:

IN THE DRAWINGS

Sheet 8 of 11, "DFFECT" should read --DEFECT--.

COLUMN 3

Line 36, "provides" should read --provide--.
Line 37, "threat" should read --thereat with--.
Line 42, "one" should read --a first--.
Line 43, "other" should read --second--.
Line 44, "one for" should read --threshold value for-- and "other to the one" should read --second to the first optically stable state--.

COLUMN 6

Line 19, "my" should read --may--.

COLUMN 11

Line 23, "sped" should read --speed--.

COLUMN 12

Line 45, "25" should be deleted.

COLUMN 13

Line 27, "where" should be deleted.

UNITED STATES PATENT AND TRADEMARK OFFICE
CERTIFICATE OF CORRECTION

PATENT NO. : 5,353,141
DATED : October 4, 1994
INVENTOR(S) : KENJI ONUMA, ET AL.

It is certified that error appears in the above-identified patent and that said Letters Patent is hereby corrected as shown below:

COLUMN 14

Line 2, "applied" should read --applied to--.
Line 9, "uniform uniform" should read --uniform--.

COLUMN 17

Line 21, "alignment" should read --aligning--.

COLUMN 18

Line 11, "rubbing condition" should read --feeding speed of the rubbing roller--.

Signed and Sealed this

Ninth Day of May, 1995

Attest:

BRUCE LEHMAN

Attesting Officer   Commissioner of Patents and Trademarks